United States Patent [19]

Bivens et al.

[11] 3,758,584
[45] Sept. 11, 1973

[54] HYDROGENATION OF ADIPONITRILE

[75] Inventors: Donald Bernard Bivens; Leo Wesley Patton; William Erbie Thomas, Jr., all of Orange, Tex.

[73] Assignee: E.I. du Pont de Nemours and Company, Wilmington, Del.

[22] Filed: Dec. 23, 1970

[21] Appl. No.: 101,167

[52] U.S. Cl............................. 260/583 K, 252/459
[51] Int. Cl.......................................... C07c 85/12
[58] Field of Search...................... 260/583 K, 583 P

[56] References Cited
UNITED STATES PATENTS 2,956,075 10/1960 Boffa et al.................. 260/583 K X
3,235,600 2/1966 Evans.............................. 260/583 K Primary Examiner—Lewis Gotts
Assistant Examiner—Richard L. Raymond
Attorney—William A. Hoffman

[57] ABSTRACT

Process for the catalytic hydrogenation of adiponitrile to hexamethylenediamine at elevated temperatures and pressures in the presence of a catalyst derived from an iron or cobalt compound which has been activated in a mixture of hydrogen and ammonia at a temperature in the range of about 300° C. to about 600° C.

7 Claims, No Drawings

HYDROGENATION OF ADIPONITRILE

BACKGROUND OF THE INVENTION

Hexamethylenediamine is a well-known compound which may be prepared continuously on a commercial scale by catalytically hydrogenating adiponitrile in the presence of ammonia. A principal use of hexamethylenediamine involves condensing it with dibasic acids to produce polyamide, and in manufacturing these polyamides, especially those wherein hexamethylene diamine is reacted with adipic acid to produce polyhexamethylene adipamide.

In the continuous production of hexamethylenediamine by the catalytic hydrogenation of adiponitrile, a high purity adiponitrile is necessary; small traces of impurities present may poison the hydrogenation catalyst and so reduce the catalyst's activity and shorten its usable service life markedly. Before the adiponitrile may be catalytically hydrogenated for commercial production of hexamethylenediamine, thorough purification of the starting materials has in the past been essential.

Many catalysts have been suggested for the hydrogenation of thoroughly purified adiponitrile. Most frequently, nickel or cobalt or mixtures thereof (usually precipitated upon a finely divided carrier) and also Raney catalysts have been used for the hydrogenation reaction. Typically with these catalysts the hydrogenation of adiponitrile has been carried out in liquid ammonia at temperatures of between 90° C. and 150° C. If the temperature is raised much above 150°C., formation of undesirable secondary amines is considerably intensified; at temperatures below 90° C., the activity of these conventional catalysts is too low. The preparation of these catalysts in highly activated form is also relatively complicated and requires great care.

An improved process for hydrogenating adiponitrile in the presence of ammonia and an iron compound which has been activated by contact with hydrogen at elevated temperature is described in United States Pat. Application Ser. No. 35,573, filed on May 7, 1970, now U.S. Pat. No. 3,696,153, by B. J. Kershaw, M. G. Pounder and K. R. Wilkins. For most efficient manufacturing operation still further improvement is desired.

SUMMARY OF THE INVENTION

The present invention provides a process for the catalytic hydrogenation of adiponitrile to hexamethylenediamine in the presence of ammonia and a catalyst comprising an iron or cobalt compound in granular form which has been activated by contact with hydrogen and ammonia, the metal compound being capable ultimately of conversion into elemental form.

The catalyst for the hydrogenation is prepared by reducing an iron oxide such as ferric oxide or ferrosoferric oxide or an oxide of cobalt such as cobaltic or cobaltous oxide or a mixture thereof in hydrogen, or a hydrogen containing gas, containing from 0.001 to 10 percent by volume of ammonia at a temperature in the range of about 300° C. to about 600° C. until such time as the oxygen content of the oxide has decreased to less than 19 percent by weight. The hydrogen pressure during activation may range from 0.1 to 1000 psi and may be supplied to the metal compound being reduced at a rate of 2 to 55 scfh/pound of oxide.

When the special catalyst for use according to the present invention is used in a fixed bed it is preferably used in relatively coarse granular form (having a particle size of from about 1/10 to 1/20 inch). Much finer particle sizes tending to powders may be employed if the catalyst is used in a fluid bed or in a slurry-type reactor.

The hydrogenation of adiponitrile to hexamethylenediamine can be carried out in the presence of ammonia at temperatures in the range of about 70° C. to about 260° C. and under superatmospheric pressure.

DESCRIPTION OF PREFERRED EMBODIMENTS

In the preferred embodiments of this invention the metal compound is an oxide of iron and is reduced with hydrogen at a pressure of 0.1 to 10 atmospheres, at a flow of 5 to 15 scfh/pound of oxide, at a temperature of 350° to 420° C., the hydrogen containing from 0.25 to 3 volume percent of ammonia. The hydrogenation of adiponitrile is preferably carried out at a temperature in the range of about 90° C. to about 200° C., particularly for a continuous process, and at a hydrogen pressure of about 250 to about 400 atmospheres and in the presence of ammonia in a weight ratio of ammonia to adiponitrile of at least about 1.8/1.

The invention is further illustrated in the Examples to follow.

Example 1 - Continuous Hydrogenation -1 percent by volume of $NH_3$ in $H_2$ activating gas. As a control, a 1.38-lb sample of iron oxide, composed primarily of $Fe_2O_3$, is charged to a 7/8-inch diameter stainless steel fixed bed reactor. The oxide is activated at a hot spot temperature of 460° C. and 100 psig pressure with a gas mixture comprised of 12 scfh wet hydrogen (saturated at 100 psig and 30° C.) and 3 scfh dry hydrogen over a period of 48 hours.

Without removing the catalyst, the same vessel is used to hydrogenate continuously adiponitrile using ammonia as solvent at an inlet temperature of 121° C. and an exit temperature of 170° C. with an ammonia feed rate of 9 lb/hr. and with hydrogen at a pressure of 4800 psig. A yield to hexamethylenediamine of 98.8 percent is obtained at an average adiponitrile feed rate of 0.90 lb/lb catalyst/hr.

The same catalyst activation conditions are used as described above, except that one volume percent ammonia is added to the gas stream during activation. A continuous hydrogenation is conducted using this catalyst with an inlet temperature of 120° C. and an exit temperature of 182° C. at an ammonia feed rate of 13 lb/hr. A yield to hexamethylenediamine of 99.0 percent is obtained at an adiponitrile feed rate of 1.15 lb/lb catalyst/hr., as compared with a yield of 98.8 percent at the lower feed rate of 0.9 lb/lb of catalyst/hour.

Example 2 - Continuous Hydrogenation - 0.25 Percent by Volume of $NH_3$ in $H_2$ Activating Gas The same catalyst activation and hydrogenation conditions are used as in Example 1, except that 0.25 volume percent ammonia is added to the gas stream during activation. A continuous hydrogenation of adiponitrile is conducted using this catalyst with an inlet temperature of 120° C. and an exit temperature of 185° C. at an ammonia feed rate of 12.8 lb/hr. A yield to hexamethylenediamine of 98.1 percent is obtained at the higher adiponitrile feed rate of 1.15 lb/lb catalyst/hr.

Example 3 - Continuous Hydrogenation - 3 Percent by Volume in $H_2$ Activating Gas.

The same catalyst activation and hydrogenation conditions are used as in Example 1, except that 3.0 volume percent ammonia is added to the gas stream during activation. A continuous hydrogenation of adiponitrile is conducted using this catalyst with an inlet temperature of 121° C. and an exit temperature of 184° C. at an ammonia feed rate of 9.2 lb/hr. A yield to hexamethylenediamine of 98.6 percent is obtained at the higher adiponitrile feed rate of 1.15 lb/lb catalyst/hr.

Example 4 - Batch Hydrogenation - 1 Percent by Volume $NH_3$ in Activating Gas

An iron oxide composed primarily of $Fe_3O_4$ is reduced with 100 percent hydrogen at 460° C. for 90 hours. A batch hydrogenation of adiponitrile (ADN) using this catalyst at 150° C. and 5000 psig gives an average reaction rate of 5.0 g ADN/g catalyst/hr.

Another portion of the iron oxide is reduced for 20 hours at 470° C. with a gas stream containing 99 percent $H_2$ and 1 percent ammonia by volume. When used in a batch hydrogenation test under the same conditions as above, the reaction rate is observed to be 7.4 g ADN/g catalyst/hr.

Example 5 - Batch Hydrogenation - 1 Percent by Volume $NH_3$ in $H_2$ Activating Gas.

A 150-g portion of 200–400 mesh iron oxide catalyst is charged into a stainless steel tube of 1 inch internal diameter and 20 inches length and reduced for 24 hours with a gas stream comprised of 99 percent hydrogen and 1 percent ammonia. The gas flow rate is approximately 2000 cc/min. The catalyst sample is maintained at 470° C. during the reduction. The reduced catalyst is found to be pyrophoric.

A batch hydrogenation is conducted using 216 g. adiponitrile, 216 g ammonia, and 20 g of catalyst in a one-liter stirred autoclave, at 150° C. and 5000 psig total pressure($pH_2$ = 3500 psig; $pNH_3$ + ADN = 1500 psig). The reaction is apparently complete in 64 minutes, having consumed the theoretical quantity of hydrogen based on ADN. A similar reaction using the same catalyst activated under the same conditions except that there is no ammonia present in the hydrogen used for reduction failed to show any activity for the hydrogenation of adiponitrile in 80 minutes under the conditions given above. The above results in conjunction with the results of Example 4 illustrate the more rapid activation of the catalyst in the presence of ammonia.

Example 6 - Cobalt Catalyst - 1 Percent by Volume in $H_2$ Activating Gas

A 200-gram portion of 200–400 mesh cobalt oxide catalyst comprising a mixture of cobaltic and cobaltous oxides is charged into a stainless steel tube of 1 inch internal diameter and 20 inches length and reduced for 24 hours with a gas stream composed of 5 percent by volume hydrogen and 95 percent by volume nitrogen. The concentration of hydrogen in the reducing gas is then successively increased at hourly intervals to 10 percent, 25 percent, 50 percent, 75 percent, and 100 percent by volume. The reduction is allowed to continue with 100 percent hydrogen for four additional hours. The reducing gas is passed over the catalyst at a rate of 2 l/min. and the catalyst bed temperature is maintained at 350° C.

A batch hydrogenation is conducted using 216 g adiponitrile, 216 g ammonia, and 10.8 g of catalyst in a 1-liter stirred autoclave at 140° C. and 2500 psig total pressure. The reaction is complete in 76 minutes having consumed the theoretical quantity of hydrogen. In a similar catalyst activation and hydrogenation experiment except that 20 cc/min. of ammonia is added to the gas stream during activation, the rate of hydrogenation is increased; the theoretical quantity of hydrogen is consumed in 64 minutes.

We claim:

1. In a process for the catalytic hydrogenation of adiponitrile to hexamethylenediamine in the presence of ammonia at a temperature in the range of about 70° C. to about 260° C. under superatmospheric pressure in the presence of a metal compound which has been activated with hydrogen, the metal compound being of the group consisting of iron and cobalt compounds, the metal compound being capable ultimately of conversion into elemental form, the improvement which comprises activating the metal compound in the presence of hydrogen at a pressure in the range of 0.01 to 70 atmospheres and containing from 0.001 to 10 percent by volume of ammonia at a temperature in the range of about 300° C. to about 600° C.

2. The process of claim 1 wherein the metal compound is an oxide of iron in granular form.

3. The process of claim 2 wherein the iron compound is activated in hydrogen containing from 0.25 to 3 percent by volume of ammonia.

4. The process of claim 3 wherein the activation of the iron compound is carried out at a temperature in the range of 350° C. to 420° C.

5. The process of claim 4 wherein the activation of the iron compound is carried out in hydrogen at a pressure in the range of 0.1 to 10 atmospheres.

6. The process of claim 5 wherein the hydrogenation is carried out at a temperature in the range of about 90° C. to about 200° C. at a hydrogen pressure of about 250 to about 400 atmospheres in the presence of ammonia in a weight ratio of ammonia to adiponitrile of at least about 1.8/1.

7. The process of claim 1 wherein the metal compound is an oxide of cobalt.

* * * * *